United States Patent [19] [11] Patent Number: 4,753,028
Farmer [45] Date of Patent: Jun. 28, 1988

[54] GOOSE DECOY

[76] Inventor: Thomas E. Farmer, P.O. Box 748, Galveston, Tex. 77550

[21] Appl. No.: 941,388

[22] Filed: Dec. 15, 1986

[51] Int. Cl.$^4$ .......................................... A01M 31/06
[52] U.S. Cl. ......................................................... 43/3
[58] Field of Search .......................................... 43/3, 2

[56] References Cited

U.S. PATENT DOCUMENTS

| | | | |
|---|---|---|---|
| 2,783,572 | 3/1957 | Rohan | 43/3 |
| 2,947,104 | 8/1960 | Johnson | 43/3 |
| 3,029,541 | 4/1962 | Palmer | 43/3 |
| 3,800,457 | 4/1974 | Barrett | 43/3 |
| 4,062,141 | 12/1977 | Shjelo | 43/3 |
| 4,172,335 | 10/1979 | Farmer | 43/3 |
| 4,475,674 | 10/1984 | Farmer | 43/3 |
| 4,611,421 | 9/1986 | Jacob | 43/3 |
| 4,656,457 | 3/1987 | Nelson | 43/3 |

Primary Examiner—Gene P. Crosby
Attorney, Agent, or Firm—David P. Gordon; Howard I. Podell

[57] ABSTRACT

The invention is an inflatable portable decoy for attracting geese and other game fowl, in which wind serves to continuously maintain the body of the decoy in an inflated condition, with the decoy body fastened to a portable stake. The invention comprises a shaped stake unit and a wind-inflatable body unit which may be detachably fastened to the stake. The body unit is shaped as an open inflatable bag, made of flexible sheeting, and may be completely wrapped about the stake unit for transport and stowage purposes. Alternatively, the body unit may be a non-inflatable flexible sheet that is attachable to the stake unit and which is flared away from the stake unit by wind action to simulate a decoy body. A looped tie member which may be mounted to the body unit serves to fasten ballast to the body unit in the assembled mode, and alternatively to fasten the body member about the stake member when the unit is disassembled for storage purposes.

16 Claims, 3 Drawing Sheets

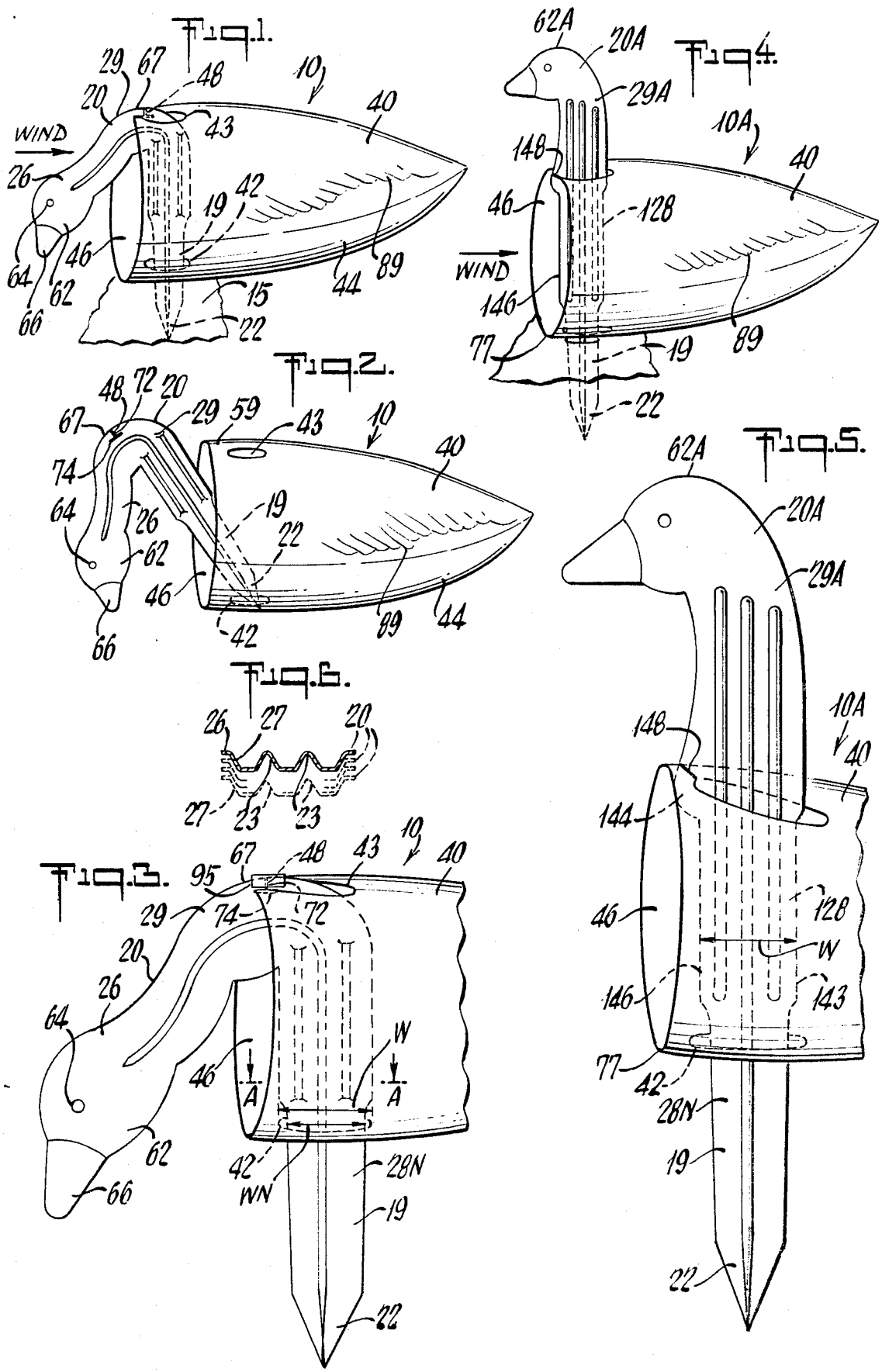

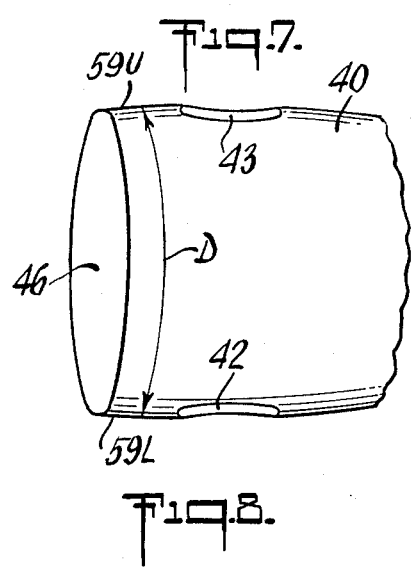
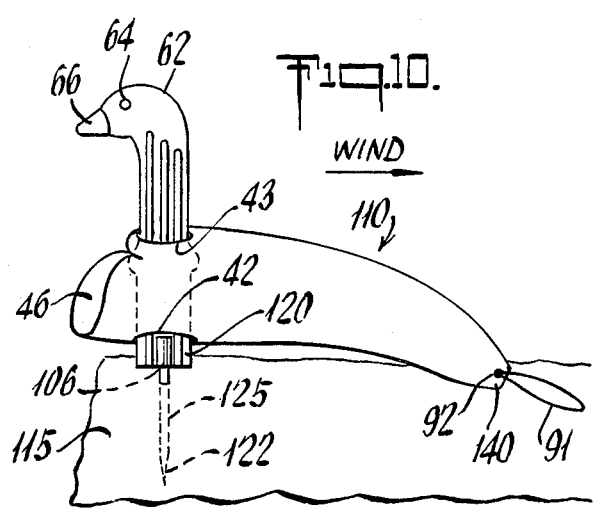
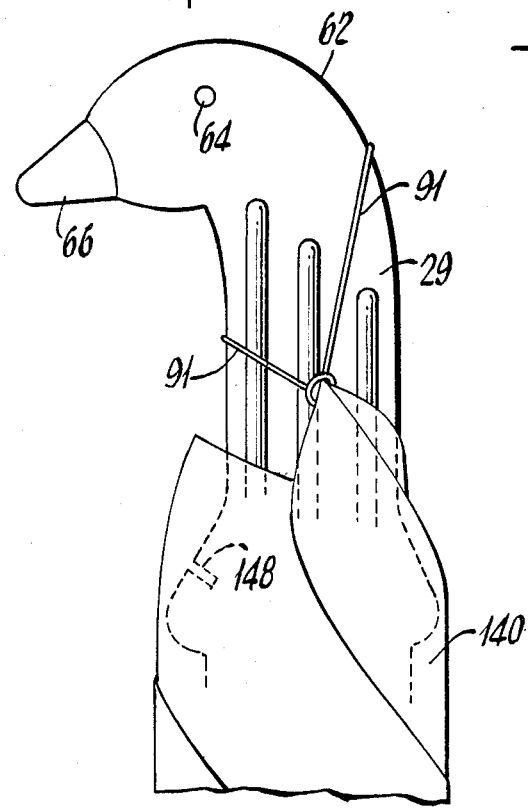
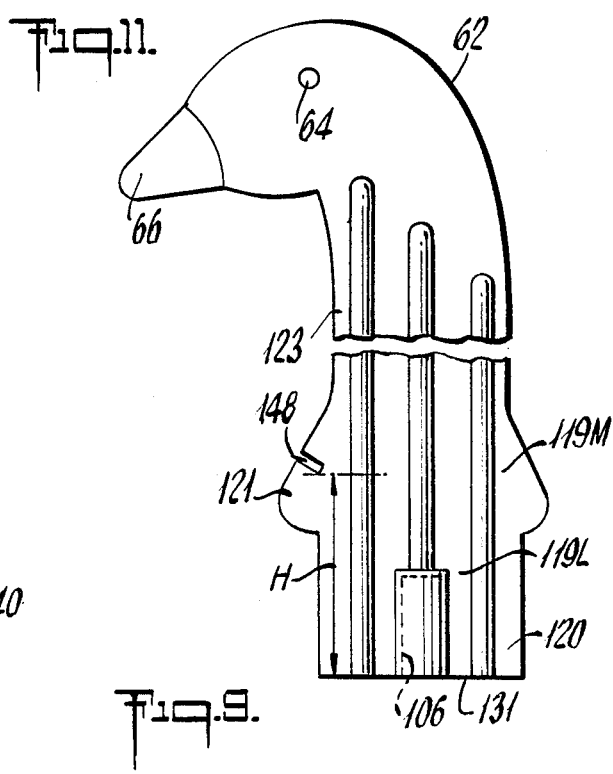
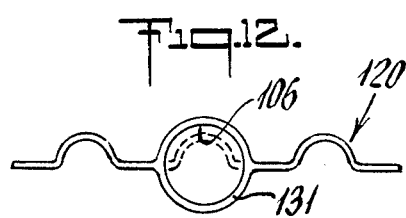
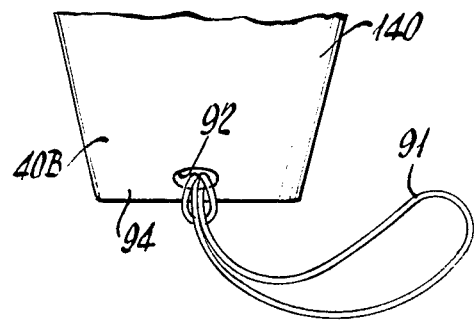

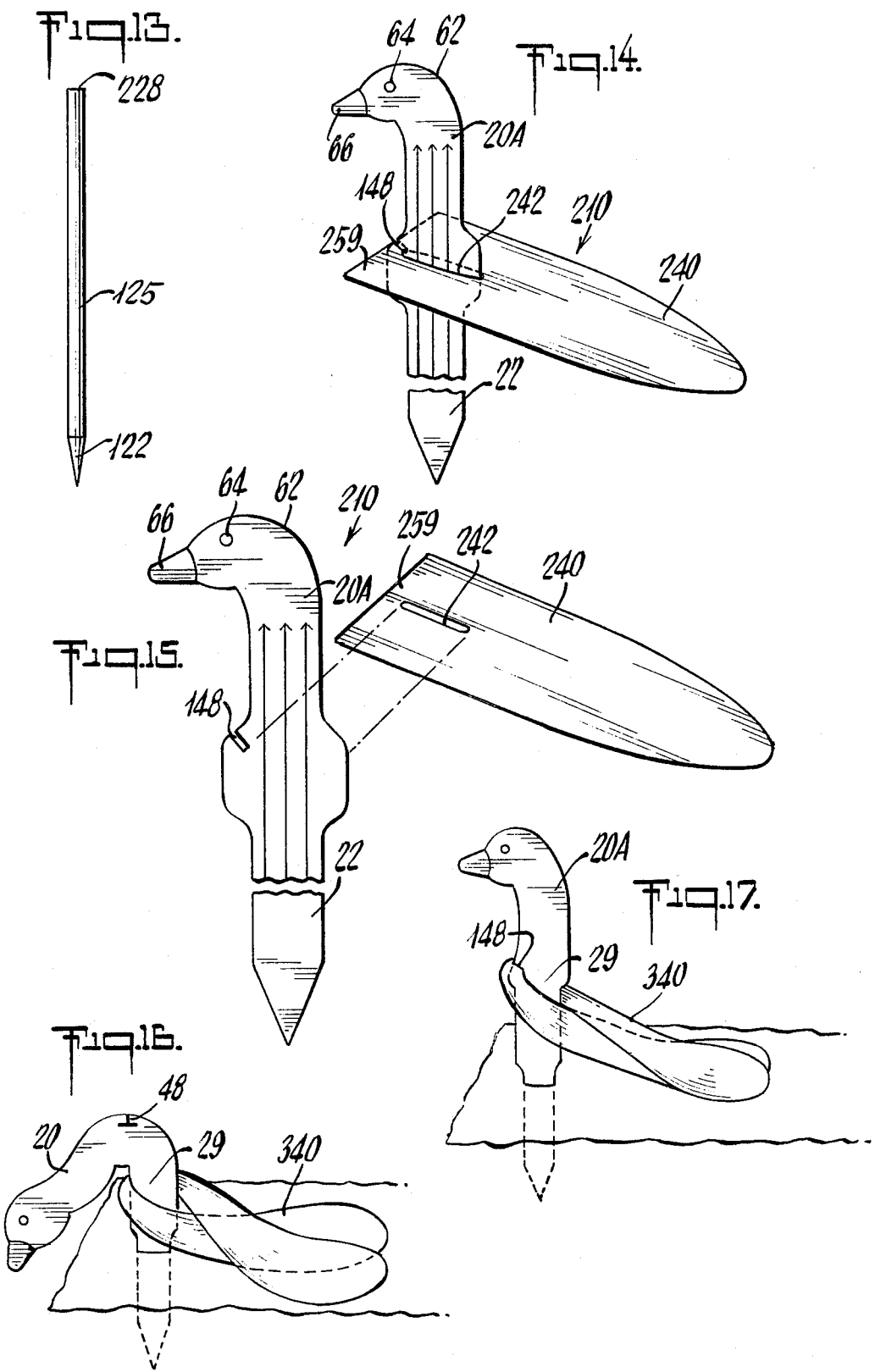

GOOSE DECOY

FIELD OF THE INVENTION

This invention relates generally to an inflatable decoy for geese and other game birds.

BACKGROUND OF THE INVENTION

Decoys are employed to attract game birds such as geese and duck. The portability of such decoys is a desirable feature, since the user sets them up for temporary use, and usually must hand-carry the decoys from place to place.

STATEMENT OF THE PRIOR ART

The prior art is exemplified by the following patents, (United States except where otherwise noted):

| | | | |
|---|---|---|---|
| 4,062,141 | 512,810 | 747,732 | 2,483,680 |
| 2,564,890 | 3,470,645 | 4,172,335 | 4,334,643 |
| 4,475,674 | | | |

Such art is generally illustrative of various decoys in the field of the invention. While such decoys are usually acceptable for their intended purposes, they do not fully meet the need of the user for a decoy of lightness of weight and compactness of stowage. As a result of the shortcomings of the prior art, typified by the above, there has developed and continues to exist a substantial need for the product of the character described. Despite this need, and the efforts of many individuals and companies to develop such processes, a satisfactory product meeting this need has heretofore been unavailable.

The principal object of my invention is to provide a product of this character which combines simplicity, and reliability together with inexpensiveness of operation and light weight characteristics together with ease of being rapidly set up in the field in actual use as well as compactness of stowage when the article is being carried from place to place.

Other objects of this invention will in part be obvious and in part hereinafter pointed out.

SUMMARY OF THE INVENTION

Decoys are employed to attract game birds such as geese and ducks. The portability of such decoys is a desirable feature, since they are set up at remote locations for temporary use. Usually a quantity of such decoys must be hand-carried from place to place. The applicant has been granted U.S. Pat. Nos. 4,172,335; 4,334,643 and 4,475,674 for portable decoys which employ bodies formed of a fixed shape that are detachably mounted to a stake unit, with the upper section of the stake unit shaped as a head of a decoy bird, and the disclosures of these patents are incorporated for reference purposes into this application.

The invention is an inflatable portable decoy for attracting geese and other game fowl, in which the wind is employed to continuously maintain the body of the decoy in an inflated condition, with the decoy body fastened to a portable stake. The invention comprises a shaped stake unit and a wind-inflatable completely flexible body unit which may be detachably fastened to the stake. The body unit is shaped as an open inflatable bag, made of flexible sheeting, and may be completely wrapped about the stake unit for transport and stowage purposes. Alternatively, the body unit may be a flexible sheet that is attachable to the stake unit and which is flared away from the stake unit by mind action to so that the complete assembly simulates a decoy body.

BRIEF DESCRIPTION OF THE DRAWING

FIG. 1 is a perspective view of the "feeder head" embodiment of the decoy invention, assembled for use;

FIG. 2 is an exploded perspective view of the invention of FIG. 1, prior to assembly;

FIG. 3 is a detail perspective view of the invention of FIG. 1;

FIG. 4 is a perspective view of the "sentinel head" embodiment of the decoy invention, a second embodiment of the invention, assembled for use;

FIG. 5 is a detail perspective view of the invention of FIG. 4;

FIG. 6 is a sectional view of the invention taken at line A—A of FIG. 3;

FIG. 7 is a detail perspective view of the body unit of the invention;

FIG. 8 is a detail perspective view of a third alternative embodiment of the invention, wrapped for stowage;

FIG. 9 is a detail perspective view of the rear section of the body unit of the third alternative embodiment of the invention;

FIG. 10 is a perspective view of a fourth alternative embodiment of the invention, preferred for use in frozen ground;

FIG. 11 is a detail view of the head section of the invention shown in FIG. 10;

FIG. 12 is a bottom view of the head section of the invention shown in FIG. 10;

FIG. 13 is an elevation view of the rod unit of the invention shown in FIG. 10;

FIG. 14 is a perspective view of a fifth alternative embodiment of the invention;

FIG. 15 is an exploded perspective view of the fifth alternative embodiment of the invention shown in FIG. 14;

FIG. 16 is an elevation view of a sixth alternative embodiment of the invention; and FIG. 17 is an elevation view of a seventh alternative embodiment of the invention.

DESCRIPTION OF THE BEST MODE OF THE INVENTION

Turning now descriptively to the drawing, in which similar reference characters denote similar elements through out the view, and in which directional terms are stated in relation to the position of use, except where otherwise noted, FIGS. 1–3 illustrate the feeder head decoy 10 embodiment of the invention, fastened by stake unit 20 into the ground 15 so that an attachable hollow flexible bag-shaped body 40 of the decoy is inflated by wind blowing into the interior of the body through opening 46.

As show in FIGS. 1–3 and 6, stake unit 20 is formed of a shaped flat sheet 26 formed preferably of metal or plastic material that is corrugated with longitudinal grooves 23 shaped with outwardly inclined side-walls 27 which project on the opposed face of the stake so as to provide rigidity and to permit additional stake bodies 20, as shown in dash lines ccccin FIG. 6, to be stacked in mating configuration, when stored or transported. The stake unit is formed with a pointed bottom tip 22 of a stem section 19 that is joined at its upper end to a curved neck section 29 which terminates in a downward pointing head section 62 decorated with indicia such as an eye 64 and a shaped beak 66 to resemble the head of of a fowl in the feeding position.

An inverted T-shaped slot 48 extends from the upper edge 67 of the uppermost section of curved neck section 29 of the feeder head decoy 10, with T-shaped slot 48 shaped as an open slot section 72 extending from the upper edge 67 of the stake neck section 29, with slot section 72 intersecting a lateral slot section 74 that extends on an axis generally diagonal or perpendicular to that of section 72, preferably on both sides of slot section 72.

The lower portion 28N of the stake 20 narrows as it extends to beveled tip section 22.

As shown in FIGS. 1-3, a detachable flexible body member 40 is formed of flexible fabric or plastic sheeting 44 shaped as a hollow bag terminating in an open mouth section 46 to resemble the body of a fowl when mounted to the stake 20 and filled out by wind action.

An open slot 42 extends, at a spaced distance from mouth opening 46, along the underside of the bag 40, with the length of slot 42 being greater than the width WN of the narrow section 28N of stake 20, and preferably greater than width W of the intermediate section.

In use, the pointed end of a stake 20 is slipped through the open mouth of 46 of a body 40 and through slot 42 and into the ground with the head section 62 and beak section 68 preferably facing into the wind.

A section of the upper edge section 59, adjacent an upper slot 43 of the bag, is then manually flexed through entry section 72 of T-shaped slot 48 of stake 20 to fit and latch into the lateral section 74 of T-shaped slot 48 so as to fix the flexible body 40 to the stake 20, with the weight of the body 40 serving to extend the body section 40 downwards from slot 48 and tending to open mouth section 46 to wind, with the rear portion of the body 40 serving to trail away from stake 20 under action of the wind, and serving to rotate the mouth opening 46 towards the wind so as to maintain the bag in a puffed out condition resembles the body of a bird, even when the wind shifts direction.

The normal action of wind movement will inflate the body unit 40 and cause a billowing motion that then resembles the body of a fowl waddling about in a feeding position, even when the wind direction shifts about It is to be noted that the border section 59 about mouth opening 46 of the decoy body 40 need merely be a continuation of the flexible fabric or fabric-like flexible plastic sheeting 44 making up the body section. This permits folding of the body section along any axes, as desired, to form a small flat compact package when travelling or in storage, as shown in FIG. 8.

FIGS. 8 and 9 show a flexible rubber band 91 fastened through one or more through holes 92 in decoy body 140. Holes 92 are located near the rear end section 94, with rubber band 91 looped about itself so as to be securely fastened through holes 92 to the rear section 94 of the decoy body 140.

When the body 140 is wrapped about the stem section 19 of a stake unit 20, as shown in FIG. 8, rubber band 91 may be looped about the neck section 29 of stake 20. for secure stowage. When the rubber band is freed from engagement with the neck section 29, the body section may be unfolded. The stake can then be set in place in the ground, by the user, with wind serving to billow out the body section, and with the rubber band serving as a ballast of the tail section of the body by lending versimilitude to the decoy in weighing down the rear tail section of the decoy body, as shown in FIG. 10.

In a stiff wind, the attached rubber band serves as a fastening means to prevent the body section from being whipped about by a strong wind, with the free end of the rubber band fixed to a weight or to a twig fastened in the ground. With little or no wind at all, it may be desirable to fasten the free end of the flexible rubber band to a weight or to an object fixed to the ground so as to maintain the body in an extended position.

For assembly of the device, the operator separates the edges of the wind mouth opening 46 of a decoy bag body 40 or 140 and carefully slides the tip 22 of the stake 20 into the wind mouth opening 46 of the decoy bag body 40 amd though bottom slot 42 of bag body 40, as shown in FIG. 2. The upper edge 59 of wind mouth opening 46 of the bag body 40 is manually slid by the operator over the top of the curved neck section 29 and the edge section 59 of top bag slot opening 43 is tucked into T-shape slot 48 of the stake body 20. The lower edge 77 of the wind mouth opening of the bag freely falls open because of the weight of the bag, allowing the wind t inflate the decoy bag body 40. If desired, the bag can be latched in place in the T-shaped slot by fastening a section of adhesive tape 95 about the entry portion 72 of T-shaped slot 48.

FIGS. 4-5 illustrate a second alternative embodiment 10A of the invention in which the stake unit 20A is of a shape to simulate the head and neck of an erect fowl in the sentinel position. The neck section 29A of the stake unit is a vertical continuation of the body of the stake unit 20A, with stake extending along a straight vertical axis between the tip 22 and the head section 62A. The intermediate section 128 above tip section 28 may be of uniform width W from the leading edge 146 to the trailing edge 143, aside from a bulge section 144 which projects forward of the leading edge 146 below neck section 29A, and rearwards of the trailing edge 143.

A slot 148 extends diagonally downwards from the leading edge 147 of the bulge section 144 of the stake 20A, with slot 148 of a size and shape to fit about and engage the ba border section 59, adjacent top slot opening 43, of a body unit 40.

For assembly of the sentinel decoy, the operator separates the edges of the wind mouth opening 46 of decoy bag body 40 and carefully slides the tip 22 of the stake 20A through first the top slot 43 and then the bottom slot 42 of bag body 40. The upper edge 57 of wind mouth opening 46 is stretch upwards until the leading edge section 58 of top bag slot opening 43 is tucked into notched slot 148 of the stake body 20A. The lower edge 77 of the wind mouth opening of the bag freely falls open, from the effect of gravity, allowing the wind to inflate the decoy bag body 40.

FIGS. 10-13 illustrate a fourth alternative embodiment 110 of the invention which is particularly suitable for mounting into frozen or hard ground 115, comprising a steel rod 125 with a pointed tip 122, the cap end 228 of which rod 125 may be readily mounted into, or removed from hollow socket 106 opening of decoy head section 120. Socket opening 106 extends from lower edge 131 of the flat member that serves as the head unit 120. Head unit 120 is shaped at its upper end as the neck and head section 62 of a decoy in the alert sentinel position, as shown in FIGS. 10 and 12, but a head unit shaped as the head and neck section of a decoy in the feeding position shown in FIG. 3 may also be employed. Rod 125 may be preferably driven into frozen ground 115 by hammering on cap end 228 prior to assembly to the upper head section 120.

Head unit 120 and an attached body unit 40 or 140 is free to rotate to face the direction of the wind, rotating about rod 125 to which it is mounted when a detachable bag body 40 or 140 is attached as shown in FIG. 10.

Detachable bag 40 or 140 serves as the body section of the decoy, being fabricated of flexible material, and formed with an open mouth section 46. Indicia 89 may be externally marked on the body unit to simulate the markings of a fowl.

Through slots 42 and 43 are formed in bag body 140 adjacent mouth section 46 in the lower and upper sections respectively of the bag body at a spaced distance from the mouth section 46, with lower slot 42 of a size to freely fit about the lower section 119L of stem unit 120, and upper slot 43 preferably of a size to fit about bulge section 121 extending both forwards and rearwards at the intermediate section 119M of stem unit 120 below the neck section 123 of the stem unit.

An open slot 148 extends preferably diagonally downwards from forward edge of bulge section 121, through which upper edge section 59U of body bag 140 may be latched in place as shown in FIG. 10 in the assembled mode.

FIGS. 14-15 illustrate a fifth alternative embodiment 210 of the invention comprising a stake section 20A to which a flat sheet 240 or rag of flexible material is fastened. While this embodiment is described in terms of a stake unit 20A which simulates a decoy in the alert sentinel position, it will be readily apparent that the invention also applies to the use of a stake section 20 which simulates a decoy in the feeder (head down) position, or to stake units described herein which may be rotatably mounted to rods driven into the ground.

Flexible rag 240 may be of a flat irregular shape and comprises a forward section with a closed slot section 242 of a size to fit about the head section of the stake section 20A such that the forward edge 259 that bounds slot 242 may be engaged and latched in diagonal forward slot 148 of the stake section 20A.

Despite the fact that the material 240 need not be of a specific size or shape or particularly marked, the action of the wind in causing it to billow behind the stake unit 20A, anchored in ground, creates an effect that results as an effective decoy to many types of fowl. While material 240 may be of flat material, it may also be shaped as a tubular sleeve, since the combination of the stake section 210 with a flexible wind-driven streamer unit has a decoy effect to flying geese, looking for a feeding or resting spot to settle down.

As shown in FIGS. 16 and 17, an unslotted flat rectangular-shaped flexible rag 340 may be wrapped about the curved neck section 29 of a feeder decoy stake 20 or snagged in place through forward slot 148 of a sentinel stake decoy 20A. The rag can be wrapped around the head portion of the stake and allowed to trail behind the stake, with a portion of the rag latched in place by being manually tucked into slot 48 or 148. This draped rag 340 been found to be highly effective in actual practice as a decoy when draped about a feeding head or a sentinel head stake 20 or 20A respectively of the invention regardless of whether or not there is sufficient wind to flutter the rag. The semblance of reality is furnished in practice since the stake holds enough of a forward section of the rag above the ground, with the rear section trailing behind and below the forward section of the rag 340 and with the stake serving to simulate the head and neck of a fowl in the sentinel or feeding position.

It is thought that persons skilled in the art to which this invention relates will be able to obtain a clear understanding of the invention after considering the foregoing description in connection with the accompanying drawing. Therefor, a more lengthy description is deemed unnecessary. It is understood that various changes in shape, size, and arrangement of the elements of this invention as claimed may be resorted to in actual practice, if desired.

Having thus described the invention, what I claim as new and desire to secure by Letters Patent of the United States is:

1. An inflatable portable fowl decoy comprising:
   a stake member formed as a semi-rigid unit; and
   a separate body unit attachable to said stake member and formed completely of flexible material, said body unit being shaped substantially as an open bag having an opening bounded by a flexible edge section, and said body unit being capable of and dependent upon being inflated by moving air so as to substantially simulate the shape of the body of a fowl decoy, wherein said body unit may be readily deflated into a substantially flat flexible shape suitable for wrapping about the stake member when stored or transported, and
   said stake unit is formed with slot means of a shape to retain within said slot means a folded portion of the flexible edge section of said body unit in an assembled mode of the invention,
   said slot means being of a size and shape to detachably retain a said folded section of the flexible edge section of the body unit engaged in said slot means, said edge section being adaptable to being manually unfolded when it is desired to release the said retained edge section from engagement with the stake member.

2. The invention as recited in claim 1 in which a flexible tie member is fastened to a section of the body member at a spaced distance from the flexible edge section of the body unit, said flexible member being of a size and shape that is adaptable to tie the body member about the stake unit in folded position when the body unit is wrapped in the stowage position about the stake member,
   said tie member serving alternatively in the assembled mode as means to fasten the body unit to ballast or to material fixed to the ground in which the stake member is mounted and at a distance from said stake member so as to restrain excessive motion of the body unit under the effect of wind forces.

3. The invention as recited in claim 2 in which the said flexible tie member is in the shape of a closed loop and in which the flexible tie member is fastened through at least one opening in the body member.

4. The invention as recited in claim 1 in which the stake member is shaped in the form of a relatively straight section terminating at one end in a pointed tip and joined at the opposed end of said straight section to a head section that is shaped in an outline so as to simulate the head of a fowl.

5. The invention as recited in claim 4 in which the said head section is joined to the said straight section by a curved neck section, said neck section and said head section shaped so as to simulate the head and neck of a fowl that is in position to feed from the ground to which the straight section is mounted in the assembled position of the device, with said head section located below the said neck section in the said assembled and said mounted position.

6. The invention as recited in claim 4 in which the slot means is in the form of a slot extending from a forward edge of the stake member.

7. The invention as recited in claim 5, in which the slot means is in the form of a slot extending from an upper edge of the said neck section.

8. The invention as recited in claim 1 in which said slot means is formed of a first slot section extending along a first axis from an edge of the stake member, with said slot section joined to a second slot section that extends from said first slot section and along a second axis that lies at an angle to the said first axis.

9. The invention as recited in claim 8 in which the said second slot section extends in opposed directions from the said first slot section.

10. The invention as recited in claim 9 in which the said second slot section extends along the said second axis in a substantially perpendicular direction to the said first axis so as to form a T-shaped slot.

11. An inflatable portable fowl decoy comprising a stake member formed as a semi-rigid unit; and
a separate body unit attachable to said stake member and formed completely of flexible material, said body unit being shaped substantially as a flat flexible sheet member in an unassembled position suitable for folding about the stake member when stored or transported, and said body unit being capable of and dependent upon being inflated by moving air in an assembled position so as to substantially simulate the shape of the body of a fowl decoy.

12. The invention as recited in claim 11, in which said stake unit is formed with slot means of a shape to retain within said slot means a folded portion of a flexible edge section of said body unit in an assembled mode of the invention,
said slot means being of a size and shape to detachably retain a said folded section of the flexible edge section of the body unit engaged in said slot means, said edge section being adaptable to being manually unfolded when it is desired to release the said retained edge section from engagement with the stake member.

13. The inventions as recited in claim 11, in which said body unit is formed with a slot section in proximity to a forward edge of said body unit, said slot section being of a size to fit about the stake member such that a section of the material of the body unit adjacent said slot section and a section of the stake unit adjacent the slot means of the stake member may be mutually latched together in detachable engagement.

14. The invention as recited in claim 11, in which the stake member is fitted with means to detachably mount to a rod member in rotatable engagement, with said rod member terminating in a tipped section at a first end and a top section at an opposed second end such that the tipped end of the rod may be hammered by the user into hardened ground prior to assembly of the stake member to the rod member.

15. The invention as recited in claim 1, wherein:
said body unit is capable of being tightly wrapped around said stake member when stored or transported.

16. The invention as recited in claim 11, wherein:
said body unit is capable of being tightly wrapped around said stake member when stored or transported.

* * * * *